US006011782A

United States Patent [19]
DeSimone et al.

[11] Patent Number: 6,011,782
[45] Date of Patent: Jan. 4, 2000

[54] METHOD FOR MANAGING MULTICAST ADDRESSES FOR TRANSMITTING AND RECEIVING MULTIMEDIA CONFERENCING INFORMATION ON AN INTERNET PROTOCOL (IP) NETWORK

[75] Inventors: Antonio DeSimone; Joseph Golan, both of Ocean; Ashok K. Kuthyar, Holmdel; Bryant Richard Parent, Murray Hill; Ram S. Ramamurthy, Manalapan; David Hilton Shur, Middletown, all of N.J.

[73] Assignee: AT&T Corp., New York, N.Y.

[21] Appl. No.: 08/848,456

[22] Filed: May 8, 1997

[51] Int. Cl.[7] .................................................. H04L 12/16
[52] U.S. Cl. ........................................ 370/260; 370/252
[58] Field of Search .................................... 370/259, 260, 370/261, 262, 263, 264, 265, 266, 267, 270, 271, 401, 252; 455/414, 415, 416, 417; 379/202, 212

[56] References Cited

U.S. PATENT DOCUMENTS

| 5,674,003 | 10/1997 | Anderson . | |
| 5,812,552 | 9/1998 | Arora | 370/401 |
| 5,835,723 | 11/1998 | Andrews | 370/252 |
| 5,841,976 | 11/1998 | Tai | 370/260 |

OTHER PUBLICATIONS

Ahmad, M. et al., "Multicast Communication in Unix 4.2BSD"; Proceedings of the International Conference on Distributed Computing Systems, Denver, Colorado, May 13–17, 1998, vol. C, No. ONF. 5, May 13, 1985, pp. 80–87, XP00673844; Institute of Electrical and Electronics Engineers.

Willebeek–LeMair, M. H. et al., "Distributed video conferencing systems"; Computer Communications, vol. 20, No. 3, May 1997, pp. 157–168, XP004081675.

Primary Examiner—Ajit Patel
Assistant Examiner—Ricardo M. Pizarro

[57] ABSTRACT

In a multicast capable IP network, each client terminal on a multimedia conference, for each media type it transmits, is assigned a multicast IP address and a port number (together known as a socket) on which to transmit packets, wherein each assigned multicast IP address is unique and different than the multicast IP address assigned to any other client for any media type. Each client terminal then selects, for each media type, which clients on the conference it wants to receive packets from. Only packets that are in fact requested by a client are routed over the multicast IP network to the requesting client. When a conference originator establishes the conference, a number of multicast IP addresses are allocated for later assignment to the clients during the conference. As each client joins the conference, it is assigned a multicast IP address from the allocated group for each media type it will transmit. Those assigned addresses are then marked as unavailable for assignment to any other client that subsequently joins the conference. When the original client later exits the conference, its assigned multicast IP address(es) is (are) marked as available for assignment to a later joining client. At the conclusion of the conference, all multicast IP addresses allocated to the conference are marked as available for use in another conference.

26 Claims, 3 Drawing Sheets

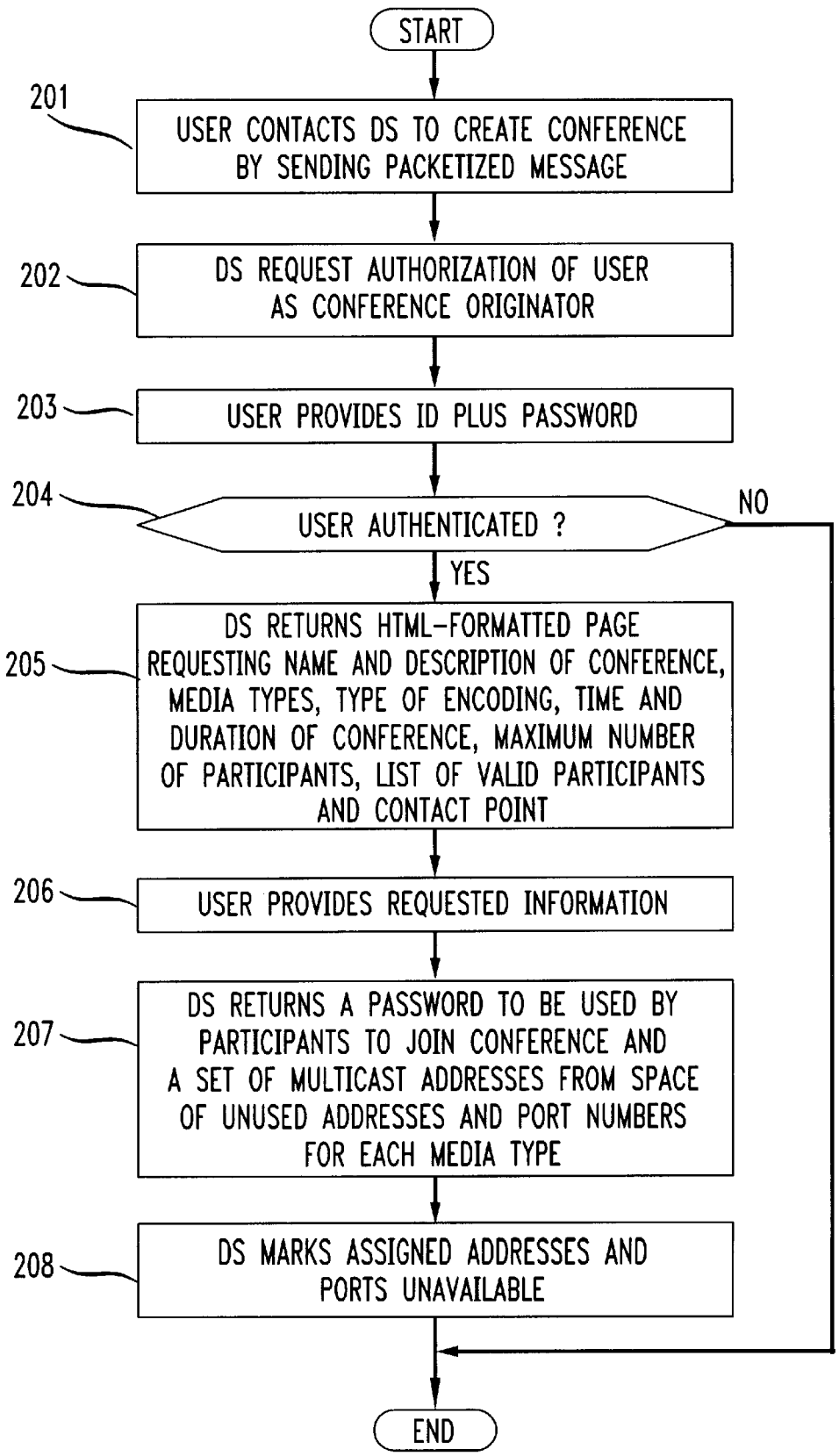

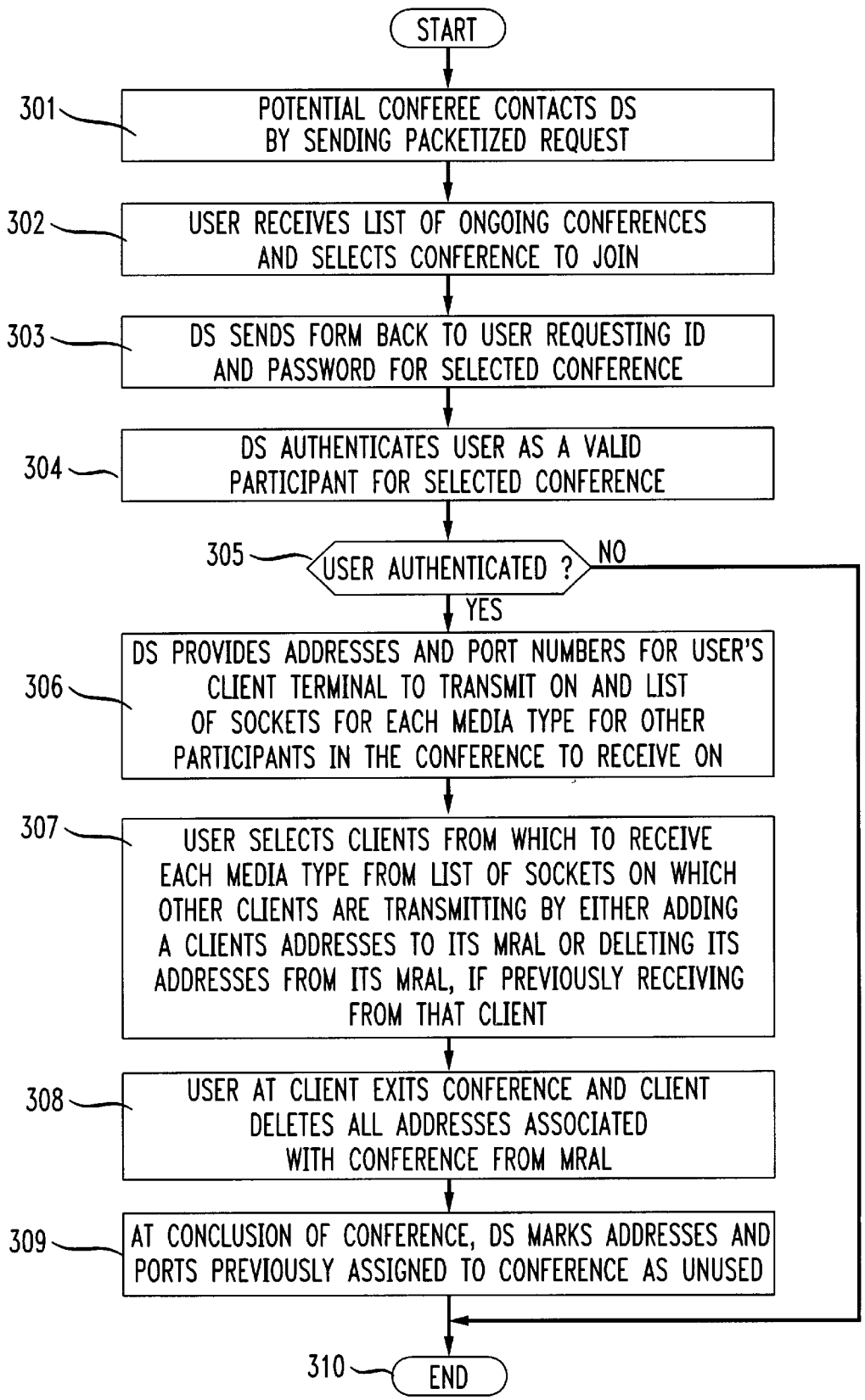

METHOD FOR MANAGING MULTICAST ADDRESSES FOR TRANSMITTING AND RECEIVING MULTIMEDIA CONFERENCING INFORMATION ON AN INTERNET PROTOCOL (IP) NETWORK

TECHNICAL FIELD

This invention relates to data communications, and more particularly, to the real-time interactive distribution of multimedia information using the multicast Internet Protocol (IP).

BACKGROUND OF THE INVENTION

Conferencing systems are typically characterized by the following: a directory service which lists the set of conferences; a dynamic mechanism for keeping track of the members of a conference as they join or leave the conference; tools for generating and processing the audio, video and data sharing components of a conference; a data network for interconnecting the members of a conference; and transport mechanisms for distributing the multimedia conference content among the conference members.

Different transport mechanisms can be used to interconnect participants depending on the underlying capabilities of the data network. Two basic communication capabilities are: unicast communication, meaning a point-to-point communication between a source and a destination end-point; and multicast communication, meaning that one source end-point reaches multiple destination end-points. Since conferencing inherently implies the possibility of more than one destination end-point, if the network is capable only of unicast communication, then either the source must create multiple unicast connections, or multicast servers external to the network must be employed. In the former case, each sender of information sets up multiple connections to every receiver, and replicates the data on each connection. Each receiver has multiple incoming connections, one for every sender of information. This approach becomes inefficient as the number of participants (N) gets large for two reasons. Firstly, the number of network connections is proportional to the square of N. Secondly, each end-point needs to replicate the data N times, possibly leading to both an excessive and unnecessary use of bandwidth in the network and an excessive amount of computation at the source. If external multicast servers are employed, then these servers perform the data replication function. Each sender of information needs to have a single unicast connection to the multicast server. Each receiver is connected to the multicast server. The number of connections is proportional to N, as all senders share the same set of connections to the set of receivers. The disadvantage of this scheme is that the multicast server becomes a bottleneck when N gets large.

When the interconnection network is multicast capable, more efficient alternatives are possible. With multicast service, the source of the information sends the data only once—the replication is handled by the network. It is as if the multicast servers described in the previous paragraph are bundled into the network. Efficient techniques for replication may exist in the network. For example, the data replication can be performed in hardware, and the replication function can be distributed over the switches or routers of the network. Furthermore the replication topology may be very efficient, e.g. a spanning tree, where receivers are leafs of the tree, and the data source is the root of the tree. Note that it is also possible to use external multicast servers in conjunction with a multicast network. For example, the multicast server may be connected to the receivers by multicast mechanisms, and to the sources by unicast mechanisms.

The Internet Protocol (IP) is a widely used transport/networking protocol. In the IP application programming interface (API) (known as IP sockets or WINSOCK), application programs may write data to, or read data from a so-called socket just as if the socket was a "file descriptor" on the local computer. A socket is linked to a pair of numbers, i.e. an IP address and a positive integer referred to as a port number. For sending, the IP address used is the destination address to be placed in the destination field IP packet header, and the port number to be used by the application process on a remote machine for receiving the data. For receiving, the IP address is implicitly the local machine address (or in the case of IP multicast, the multicast group address of interest), and the port number to be used by the application process on the local machine for receiving the data.

Multicast IP, the primary mechanism by which IP networks support multicast, is an emerging capability of the IP protocol. In IP multicast service, unlike the unicast IP service where the address represents a specific and unique end-system, a sender transmits data addressed to an abstraction called a multicast address group. In the prior art, for a given conference, each mediatype (e.g., audio, video) is associated with a particular port number and multicast IP address. All receivers for the given media-type listen to the specific socket consisting of the known multicast IP address and port number. All senders for the given media-type send to the specified socket consisting of the same multicast IP address and port number. Among different media-types, a different socket is utilized to enable different application programs to handle the different media of the conference. In prior art systems, the multicast IP address may be the same or different among media types, but the port number is almost always different.

Receivers find out about the existence of multicast groups and port numbers through various (centralized or distributed) directory mechanisms. For example, a well-known multicast IP address may be reserved for directory announcements. Alternatively, a centralized server may contain a list of multicast groups and distribute this list to clients upon request. Once the appropriate multicast IP address information has been obtained from the directory mechanism, receivers send messages to multicast server processes (e.g., in multicast routers) indicating that they want to join a particular group. The routers then exchange information about the set of users that want to communicate, and build up interconnection trees among themselves. Note that in the prior art, for a given media type, since a common multicast IP address is used by all senders and receivers in a conference, and since the multicast IP address is the atomic unit of routing, this implies that the transmissions of all senders get routed to all receivers, even if each receiver is interested in a (possibly different) subset of the senders. This requires the receiver's application program to receive, process, and discard unwanted information; furthermore the typically expensive network bandwidth required to transport the unwanted information is wasted.

SUMMARY OF THE INVENTION

In accordance with the present invention each conference rather than being represented by a single multicast IP address and port number for each media type that is used by each of the senders, is instead represented by a set of sockets, each socket comprising a multicast IP address and a port number. Specifically, each transmitting client terminal is assigned a separate socket for each media type for which the multicast IP address of each is unique with respect to the sockets assigned to any other client terminal. Each client terminal can thus select the specific multicast IP addresses from which it wishes to receive. Thus, each client terminal can select to receive those media types from only those transmitting client terminals whose transmissions it has an interest in receiving. Further, it and does not need to perform internal processing to discard transmissions those clients whose transmissions it doesn't want to receive. Therefore, in establishing the network routing within the multicast capable IP network, routing of transmissions from a transmitting terminal to a receiving terminal of each media type is only effected to those receiving endpoint clients who have elected to receive such transmission. Thus, there is no wasted use of valuable transmission bandwidth and network facilities to carry and route transmissions to those endpoint client terminals on the conference who have not elected to receive them.

When a conference is established, in accordance with the present invention, a Directory Server allocates from the then available and unused multicast IP addresses, a group of such addresses to be used for the conference based on the maximum number of expected participants, which number is provided by a conference originator. As each participant joins the conference, the particpant's client terminal is assigned a port number and multicast IP address on which to transmit for each media type, wherein the multicast IP address is from the group of multicast IP addresses allocated for use by that conference. As each multicast IP address is assigned to a client terminal, it is marked as being unavailable for use by any other client terminal. Each packet transmitted by the client terminal for each media type then thereafter includes its assigned identifier in its header. Upon joining the conference, or at any time during the conference, a conference participant can select which other clients' transmissions it desires to receive. Only those transmissions are then routed by he network to that client.

BRIEF DESCRIPTION OF THE DRAWINGS

FIG. 2 is a chart illustrating the steps associated with establishing a conference by a conference originator on the network of FIG. 1; and FIG. 3 is a chart illustrating the steps associated with a user joining an already established conference on the network of FIG. 1.

DETAILED DESCRIPTION

Figure 1:
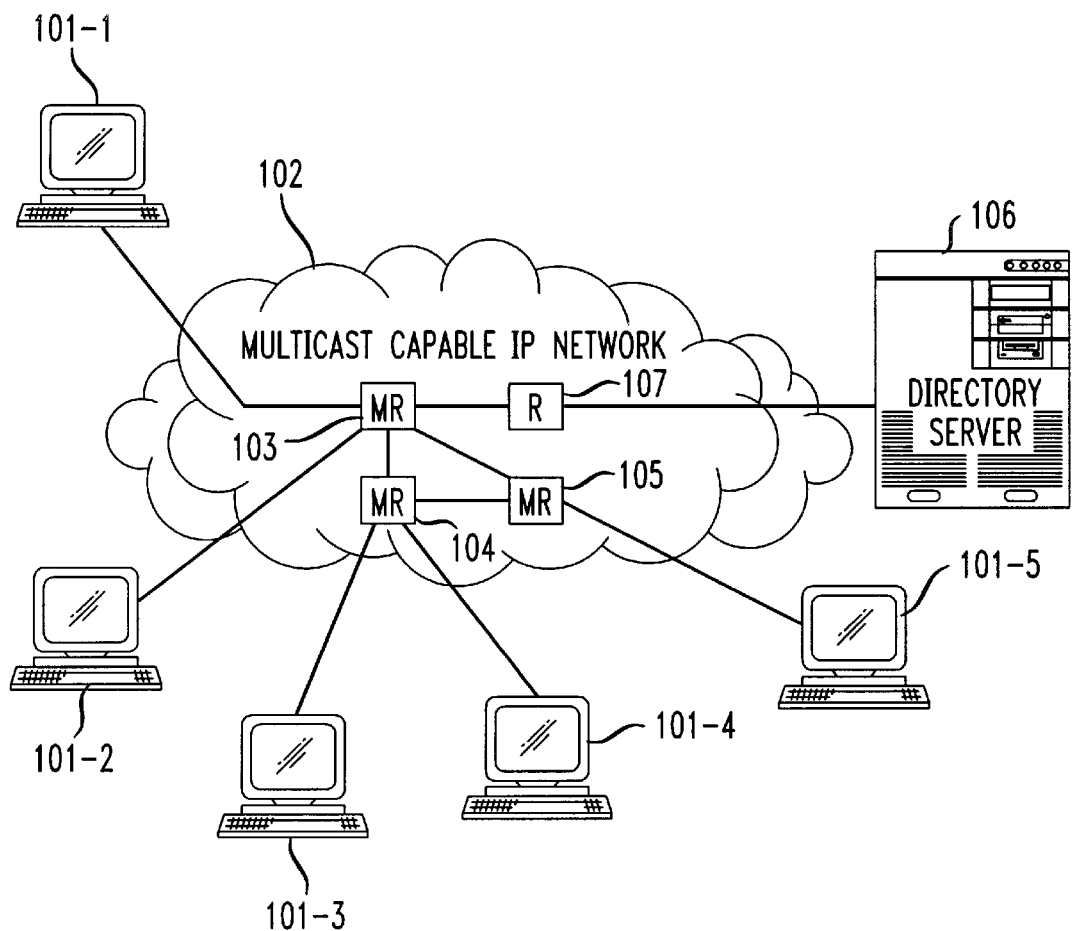
FIG. 1 is a block diagram showing a plurality of client terminals connected to a multicast capable IP network, to which is also connected a Directory Server for establishing a conference in accordance with the present invention.

With reference to FIG. 1, multimedia client terminals 101-1–101-5 are connected to a multicast capable Internet Protocol (IP) data network 102, which may, for example, be the Internet or a private IP network. The connections to the IP network 102 could be made via a Local Area Network (LAN) over T1/T3 facilities, an Asynchronous Digital Subscriber Loop (ADSL) link running a Frame Relay protocol, or over an ISND BRI link running the X.25 protocol, or any other digital or analog link. Network 102 may likely comprise plural sub-networks, with a multicast router (MR) routing packets in a multicast fashion to and from the client terminals connected to that sub-network. Thus, as illustrated in FIG. 1, client terminals 101-1 and 101-2 are connected to a common sub-network through MR 103, client terminals 101-3 and 101-4 are connected to a common second sub-network through MR 104, and client terminal 101-5 is connected to a third sub-network through MR 105. A Directory Server (DS) 106, which need not operate in a multicast fashion, is connected to the network through router 107, which need not be multicast capable.

Directory server 106 functions to maintain a list of multicast IP addresses and ports available for use for a plurality of different and possibly concurrent conferences, to assign a subset of those addresses and ports to a particular conference when a conference is initiated, and to assign from that subset a unique multicast IP address and port number to each media type of each client as that client makes a request to become a member of that conference. Once each socket (multicast IP address and port number) is assigned to a particular client for each media type for use during a conference, the assigned multicast IP addresses are marked as being unavailable and cannot be assigned to any other client attempting to join that same conference. Once a participant departs a still ongoing conference, the multicast IP addresses assigned to that participant's client are marked as being available and can be assigned to the client of a later joining participant.

Upon receiving the set of sockets assigned to it for the conference, the client may decide how it wants to interact in the conference. Specifically, for each media type the client may only want to only receive, or to both receive and transmit, or to just transmit. Further, the client may choose to receive a particular media type from only select other clients on the conference. When a conference is established and a client joins an established conference, therefore, it receives a list of sockets used for transmitting by the other clients associated with the conference. At any time during the conference, it may then receive packets from the other clients in the conference on the sockets assigned for transmission to those other clients, or it may choose not to receive packets of any or all media types from other clients by either not adding the other client's socket(s) to its Multicast Receive Address List (MRAL), or by deleting the other client's socket from its MRAL if it was previously receiving transmissions from the other client. The client then sets its local interface to receive only those packets whose IP addresses/port numbers match the ones in its MRAL. If a receiving client is located on a different sub-network than other transmitting clients, the receiving client may be periodically queried by the MR to which it is connected as to whether it wishes to receive packets with a given socket. The client will respond positively only for those sockets in its MRAL and the MRs will forward multicast packets with specific addresses to only those sub-networks from which a positive indication about receiving such specifically addressed packets is received. Advantageously, therefore, only those multicast packets that are requested to be received by a client on one sub-network from a transmitting client on another sub-network need to be routed between sub-networks. Unnecessary inter sub-network transmission of packets is thus eliminated, thereby minimizing use of valuable transmission facilities.

In FIG. 1, for example, the conference may comprise the client terminals 101-1–101-5. One the conference is established by the conference originator on Directory Server 106, the user at each client may elect to receive audio signals from each of the other clients but may elect to receive video from only select other clients. Thus, for the media type of audio signals, the MRAL of each client includes the sockets of each of the other clients for the media type of audio signals. Multicast audio packets from each client are thus routed and transmitted through the multicast routers 103, 104 and 105 to each client. The users at clients 101-3, 101-4 and 101-5 may, however, elect to not receive video signals from clients 101-1 and 101-2. The MRALs of clients 101-3–101-5 thus do not include the sockets for video packets for clients 101-1 and 101-2. Multicast video packets transmitted by clients 101-1 and 101-2 are thus not routed by multicast router 103 and remain only within their common subnetwork.

With reference to FIG. 2, the steps to originate a conference by a conference originator are detailed. At step 201, by sending a packetized message, a user contacts the Directory Server to create a conference. This could be accomplished by the user clicking on an icon on a browser running on the client, or by the user inputting a particular URL address. At step 202, the Directory Server requests the authorization of the user as a conference originator. At step 203, the user provides his or her ID plus a password. At step 204, if recognized by the DS as an authorized conference originator, the user is authenticated and permitted to proceed to establish the conference. If not, the process ends at step 209. If authenticated, at step 205, the Directory Server returns to the user, for example, an HTML-formatted page requesting information from the originator such as the name and description of the conference, the media types involved with the conference, the types of encoding used by each of the media types, the time at which the conference is scheduled to take place and its expected duration, the maximum number of participants, a list of valid participants, and the name and phone number of a contact point for the proposed conference. The user provides the requested information at step 206. At step 207, the Directory Server returns to the conference originator a password to be used by the participants in order to join the conference and allocates a set of multicast IP addresses and port numbers from the space of available multicast IP addresses and port numbers for each media type. Specifically, in accordance with this invention, a block of multicast IP addresses of a size a power of two is reserved for the conference. As each client later joins the conference, it is assigned an address one higher than the previously assigned address. Beneficially, multicast routers can group adjacent addresses together and route a block of multicast addresses based on an entry for a single multicast address prefix in the multicast routing table. At step 298, the Directory Server marks the assigned multicast IP addresses as being unavailable for assignment to any other conference. In other embodiments, the addresses could be incremented by a positive or negative integer of one or greater.

Once the conference originator has established the conference with the Directory Server, users at the client terminals may join the conference within its scheduled time. With reference to FIG. 3, at step 301 a potential conferee contacts the DS by sending a packetized request either by clicking on an icon or inputting the URL address of the DS on the client's browser. At step 302, the client receives from the DS a list of ongoing conferences from which the user selects the conference to which he or she wants to join. At step 303, in response to the selected conference, the DS sends a form back to the user's client requesting the user's ID and the password assigned by the DS to the conference. It is assumed that the password is made available to the conferees by an external system, such as a phone call/message, or encrypted e-mail. The user inputs the requested information and, at step 304, the DS compares the inputted information with its list of valid conference participants as inputted by the conference originator, and the password established for the conference. If the user is not authenticated at step 305, he or she is precluded from joining the conference and the process ends at step 310. If authenticated at step 305, the DS provides an address and port number for each media type for the client terminal to transmit on and a list of sockets for each media type to receive on for the other client terminals which are participating in the conference. At step 307, the user selects those clients from which to receive each media type from the list of sockets on which the other clients are transmitting. This is done by either adding the other client's address to its MRAL or deleting the other client's address (es) from its MRAL if it has been previously receiving a currently unwanted media type of transmission from that other client. When a client elects to exit a conference, it deletes all the addresses /ports associated with the conference from its MRAL. When the conference is concluded, the Directory Server, at step 309, marks the addresses and ports assigned to the conference as available so they can be assigned to another conference.

As described hereinabove, the Directory Server 106 is shown as being a centralized single server connected to the multicast capable IP network 102 in FIG. 1. The Directory Server could, alternatively, be a distributed algorithm on the network 102 that is executable by a client terminal desiring to create a conference and/or join a conference in accordance with the methods described above.

The above-described embodiment is illustrative of the principles of the present invention. Other embodiments could be devised by those skilled in the art without departing from the spirit and scope of the present invention.

The invention claimed is:

1. In a multicast capable Internet Protocol network in which during a conference at least one of a plurality of clients transmits packets on a socket "of a plurality of sockets" for multicast transmission of those packets to at least some of the plurality of clients in the conference, each "of the sockets" comprising a multicast Internet Protocol address, a method comprising:

assigning to each client in the conference a socket having a different unique multicast Internet Protocol address on which to transmit packets.

2. The method of claim 1 wherein the conference is a multimedia conference in which packets of plural media types are transmitted by the at least one client, the step of assigning comprising assigning a socket having a different unique multicast Internet Protocol address to each client in the conference for each media type transmitted.

3. The method of claim 2 wherein the plural media types are at least one of audio, video and/or data.

4. The method of claim 2 further comprising the step of routing to the at least one client packets transmitted on sockets by those clients selected by the at least one client from the plurality of clients on the conference.

5. The method of claim 1 wherein the multicast Internet Protocol addresses of the sockets assigned to the clients on the conference are from a group of multicast Internet Protocol addresses allocated to the conference.

6. The method of claim 5 wherein the group of multicast Internet Protocol addresses allocated to the conference has a size that is a power of two.

7. The method of claim 6 wherein the multicast Internet Protocol address of the socket assigned to the at least one client is incremented by a positive or negative integer of least one from the multicast Internet Protocol address associated with the socket previously assigned to another client on the conference.

8. A method on a multicast capable Internet Protocol network for a client to join a conference with at least one other client comprising the steps of:

assigning to the client as it joins the conference a socket on which to transmit packets, the socket comprising a multicast Internet Protocol address, the multicast Internet Protocol address of the assigned socket being different than the multicast Internet Protocol address of a socket assigned to any other client on the conference, the multicast Internet Protocol address of the socket assigned to each one of the any other clients on the conference being different than the multicast Internet Protocol address of any other assigned socket;

receiving from the joining client an indication of which clients on the conference it selects to receive transmitted packets from; and routing to the joining client packets transmitted on those sockets associated with the selected clients.

9. The method of claim 8 wherein the conference is a multimedia conference in which packets of plural media types are transmitted by the joining client and the at least one other client, the step of assigning a socket to the joining client comprising assigning a socket with a different unique multicast Internet Protocol address to each media type transmitted by the joining client.

10. The method of claim 9 wherein the plural media types are at least one of audio, video and/or data.

11. The method of claim 9 wherein the step of receiving comprises receiving from the joining client an indication of from which clients and on which media types it selects to receive transmitted packets, and the step of routing comprises routing to the joining client packets transmitted on those sockets associated with the selected clients and media types.

12. The method of claim 8 wherein the multicast Internet Protocol address of the socket assigned to the joining client as it joins the conference is from a group of multicast Internet Protocol addresses allocated to the conference.

13. The method of claim 12 wherein the group of multicast Internet Protocol addresses assigned to the conference has a size that is a power of two.

14. The method of claim 13 wherein the multicast Internet Protocol address of the socket assigned to the joining client incremented by a positive or negative integer of at least one from the multicast Internet Protocol address of the socket previously assigned to any other client on the conference.

15. The method of claim 12 further comprising the step of marking as unavailable for assignment to another client joining the conference the multicast Internet Protocol address assigned to the joining client from the group of multicast Internet Protocol addresses allocated to the conference.

16. The method of claim 15 further comprising the step of marking as available for assignment to another client in the group of multicast Internet Protocol addresses allocated to the conference the multicast Internet Protocol address assigned to the joining client if and when the joining client exits the conference.

17. A method of establishing a conference on a multicast capable IP network comprising the steps of:

receiving from an originating client a request to establish the conference;

allocating a plurality of separate and unique multicast Internet Protocol addresses for each of a plurality of clients for a maximum number of clients that will be participants in the conference, the maximum number of clients being provided by the originating client.

18. The method of claim 17 wherein the conference is a multimedia conference in which packets of plural media types are transmitted by at least some of the clients that are participants in the conference, and the step of allocating allocates a separate and unique multicast Internet Protocol address for each of the plural media types transmitted by the maximum number of clients that will be participants in the conference.

19. The method of claim 18 wherein the plural media types are at least one of audio, video, and/or data.

20. The method of claim 17 wherein the number of multimedia Internet Protocol addresses allocated to the conference is a power of two.

21. Apparatus associated with a multicast capable Internet Protocol network for establishing and running a conference on which at least one of a plurality of clients connected to the network transmits packets for multicast transmission to at least some of the plurality of clients on the conference on a socket that comprises a multicast Internet Protocol address, the apparatus comprising:

means for receiving a request to join the conference from one of the clients; and means for assigning to the one of the clients a socket with a unique multicast Internet Protocol address on which to transmit packets which is different than a multicast Internet Protocol address of a socket assigned to any other client on the conference, the multicast Internet Protocol address of the socket assigned to each one of the any other clients on the confrence being different than the multicast Internet Protocol address of any other assigned socket.

22. The apparatus of claim 21 further comprising means responsive to a request to establish the conference by a conference originator for allocating a plurality of separate and unique multicast Internet Protocol addresses for a maximum number of participants in the conference, the maximum number being provided by the conference originator.

23. The apparatus of claim 22 wherein a of multicast Internet Protocol addresses allocated to the conference is a power of two.

24. The apparatus of claim 23 wherein the assigning means assigns to the one of the clients a socket having a multicast Internet Protocol address that is incremented by a positive or negative integer of at least one from than the multicast Internet Protocol address of the socket previously assigned to another client on the conference.

25. The apparatus of claim 21 wherein the conference is a multimedia conference in which packets of plural media types are transmitted by the one of the clients and at least one of the other clients, the assigning means assigning a socket with a unique multicast Internet Protocol address to each media type transmitted by the one of the clients.

26. The apparatus of claim 25 wherein the plural media types are at least one of audio, video and/or data.

* * * * *